United States Patent
Lin

(10) Patent No.: US 11,372,578 B2
(45) Date of Patent: Jun. 28, 2022

(54) CONTROL METHOD FOR FLASH MEMORY CONTROLLER AND ASSOCIATED FLASH MEMORY CONTROLLER AND MEMORY DEVICE

(71) Applicant: Silicon Motion, Inc., Hsinchu County (TW)

(72) Inventor: Ching-Hui Lin, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 17/199,388

(22) Filed: Mar. 11, 2021

(65) Prior Publication Data

US 2022/0066687 A1     Mar. 3, 2022

(30) Foreign Application Priority Data

Aug. 27, 2020   (TW) .................................. 109129292

(51) Int. Cl.
*G06F 3/06* (2006.01)

(52) U.S. Cl.
CPC .......... *G06F 3/0655* (2013.01); *G06F 3/0608* (2013.01); *G06F 3/0679* (2013.01)

(58) Field of Classification Search
CPC .... G06F 3/0655; G06F 3/0679; G06F 3/0608; G06F 3/0649
USPC .................................................. 711/154, 103
See application file for complete search history.

(56) References Cited

U.S. PATENT DOCUMENTS

| | | | |
|---|---|---|---|
| 9,069,474 B2 | 6/2015 | Venkata | |
| 10,102,118 B2 | 10/2018 | Kanno | |
| 2016/0196064 A1* | 7/2016 | Noda | G06F 12/0246 |
| | | | 711/101 |
| 2017/0123700 A1 | 5/2017 | SinHa | |
| 2017/0344269 A1* | 11/2017 | Kumano | G06F 3/0649 |
| 2020/0117361 A1 | 4/2020 | Cheng | |
| 2020/0293198 A1* | 9/2020 | Anazawa | G06F 3/0688 |

FOREIGN PATENT DOCUMENTS

| | | |
|---|---|---|
| TW | 201405559 A | 2/2014 |
| TW | 201802683 A | 1/2018 |
| WO | 2013/052562 A1 | 4/2013 |

* cited by examiner

*Primary Examiner* — Hashem Farrokh
(74) *Attorney, Agent, or Firm* — Winston Hsu

(57) ABSTRACT

A control method of a flash memory controller, wherein the control method includes the steps of: when data is written to a page of any block of a flash memory module, recording a write time in the page; create a write time table, wherein the write time table records block numbers of blocks having data written therein and corresponding write time; compress the write time table to generate a compressed write time table, wherein the compressed write time table contains multiple time ranges and corresponding indexes, each index corresponds to a page of the flash memory module, and the page records block numbers of all blocks whose writing time is within the corresponding time range.

18 Claims, 12 Drawing Sheets

| Block number | Time information of first page | Time information of intermediate page |
|---|---|---|
| B1 | T1_1 | T1_M |
| B2 | T2_1 | T2_M |
| ..... | ..... | ..... |

| Time range | Dedicated physical block number | Physical page number |
|---|---|---|
| Today | B200 | P001, P004 |
| 1 day ago | B201 | P010, P012 |
| 2 days ago | B202 | P032, P033 |
| ..... | ..... | ..... |
| 13 days ago | B213 | P100, P100 |

CONTROL METHOD FOR FLASH MEMORY CONTROLLER AND ASSOCIATED FLASH MEMORY CONTROLLER AND MEMORY DEVICE

BACKGROUND OF THE INVENTION

1. Field of the Invention

The present invention relates to a flash memory, and more particularly, to a flash memory controller and an associated control method.

2. Description of the Prior Art

With development of three-dimensional (3D) flash memory technology, more layers are stacked in a flash memory chip. In addition, nowadays, a flash memory module includes Triple-Level Cell (TLC) blocks or Quad-Level Cell (QLC) blocks. Therefore, quality of data stored in the flash memory is getting worse, and the quality of data even declines rapidly in only a few weeks after the data is written, causing the data difficult to be decoded or even unreadable. To solve this problem, the flash memory controller can use idle time to read apart of a content of each block in the flash memory module to determine the quality of each block. However, the above method costs much time. Further, when the flash memory controller is often busy, the flash memory controller is not able to balance the access efficiency and the quality of blocks.

SUMMARY OF THE INVENTION

One of the objectives of the present invention is to provide a flash memory control and an associated method for efficiently pre-processing those blocks in the flash memory module that may have quality problems, to solve the aforementioned problem.

At least one embodiment of the present invention provides a control method applied to a flash memory controller. The flash memory controller is configured to access a flash memory module. The flash memory module includes a plurality of blocks, and each block includes a plurality of pages. The control method includes: when data is written to any block of the flash memory module, recording a write time in the block; creating a write time table, wherein the write time table records block numbers of blocks having data written therein and corresponding write time; compressing the write time table to generate a compressed write time table, wherein the compressed write time table includes multiple time ranges and corresponding indexes, each index corresponds to a page of the flash memory module, and the page records multiple block numbers and write time of all blocks whose write time is within a corresponding time range; referring to a current time of executing the control method to determine a specific time range selected from the multiple time ranges in the compressed write time table, and referring a page address corresponding to the specific time range to read multiple block numbers and corresponding write time from the flash memory module; recording at least a part of the multiple block numbers in an expired block table; and referring to the at least a part of the multiple block numbers recorded in the expired block table to sequentially move valid data in blocks with the at least a part of the multiple block numbers to at least one blank block.

At least one embodiment of the present invention provides a flash memory controller being configured to access a flash memory module. The flash memory controller includes a read only memory, a microprocessor and a buffer memory. The read only memory is configured to store a code. The microprocessor is configured to execute the code for controlling access of the flash memory module. When the microprocessor writes data to any block of the flash memory module, a write time is recorded into the block, and a write time table is created. The write time table records block numbers of blocks having data written therein and corresponding write time, and the microprocessor compresses the write time table to generate a compressed write time table. The compressed write time table includes multiple time ranges and corresponding indexes, each index corresponds to a page of the flash memory module, and the page records block numbers and write time of all blocks whose write time is within a corresponding time range. The microprocessor refers to a current time to determine a specific time range selected from the multiple time ranges in the compressed write time table, and refers to an index corresponding to the specific time range to read multiple block numbers and corresponding write time from the flash memory module; the microprocessor records at least a part of the multiple block numbers in an expired block table, and refers to the at least a part of the multiple block numbers recorded in the expired block table to sequentially move valid data in blocks with the at least a part of the multiple block numbers to at least one blank block.

At least one embodiment of the present invention provides a memory device including a flash memory module and a flash memory controller. The flash memory controller is configured to access the flash memory module. When the flash memory controller writes data to any block of the flash memory module, a write time is recorded into the block, and a write time table is created. The write time table records block numbers of blocks having data written therein and corresponding write time, and the flash memory controller compresses the write time table to generate a compressed write time table. The compressed write time table includes multiple time ranges and corresponding indexes, each index corresponds to a page of the flash memory module, and the page records block numbers and write time of all blocks whose write time is within a corresponding time range. The flash memory controller refers to a current time to determine a specific time range selected from the multiple time ranges in the compressed write time table, and refers to an index corresponding to the specific time range to read multiple block numbers and corresponding write times from the flash memory module. The flash memory controller records at least a part of the multiple block numbers in an expired block table, and refers to the at least a part of the multiple block numbers recorded in the expired block table to sequentially move valid data in blocks with the at least a part of the multiple block numbers to at least one blank block.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a diagram illustrating the write time table according to an embodiment of the present invention.

FIG. 6C is a diagram illustrating an expired recycling block index table according to another embodiment of the present invention

DETAILED DESCRIPTION

Figure 1:
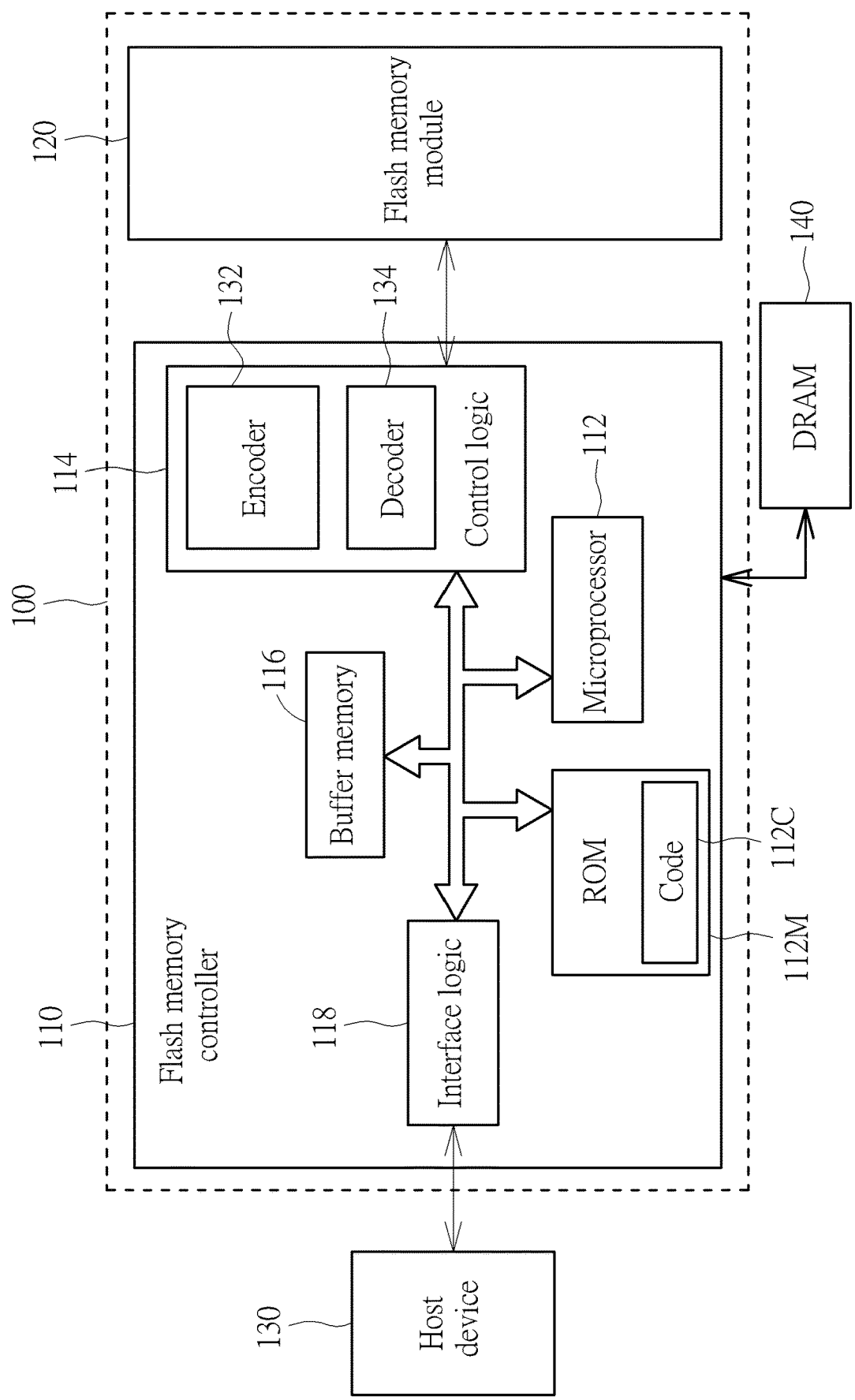
FIG. 1 is a diagram illustrating a memory device according to an embodiment of the present invention.

FIG. 1 is a diagram illustrating a memory device 100 according to an embodiment of the present invention. The memory device 100 includes a flash memory module 120 and a flash memory controller 110. The flash memory controller 110 is configured to access the flash memory module 120. According to the present embodiment, the flash memory controller 110 includes a microprocessor 112, a read only memory (ROM) 112M, a control logic 114, a buffer memory 116 and an interface logic 118. The read only memory 112M is configured to store a code 112C, and the microprocessor 112 is configured to execute the code 112C to control access of the flash memory module 120. The control logic 114 includes an encoder 132 and a decoder 134, wherein the encoder 132 is configured to encode data which is written in the flash memory module 120 to generate a corresponding check code (also known as an error correction code (ECC)), and the decoder 134 is configured to decode data read from the flash memory module 120.

In a general situation, the flash memory module 120 includes a plurality of flash memory chips, and each flash memory chip includes a plurality of blocks. The flash memory controller 110 performs a block-based erase operation upon the flash memory module 120. In addition, a block can record a specific number of pages, wherein the flash memory controller 110 performs a page-based write operation upon the flash memory module 120. In the present embodiment, the flash memory module 120 is a 3D NAND-type flash memory module.

In practice, through the microprocessor 112 executing the code 112C, the flash memory controller 110 may use its own internal components to perform many control operations. For example, the flash memory controller 110 uses the control logic 114 to control access of the flash memory module 120 (especially access of at least one block or at least one page), uses the buffer memory 116 to perform a required buffering operation, and uses the interface logic 118 to communicate with a host device 130. The buffer memory 116 is implemented by a random access memory (RAM). For example, the buffer memory 116 may be a static RAM (SRAM), but the present invention is not limited thereto. In addition, the flash memory controller 110 is coupled to a dynamic random access memory (DRAM) 140. It should be noticed that a DRAM 140 may also be included in the flash memory controller 110, for example, be included in the same package with the flash memory controller 110.

In one embodiment, the memory device 100 may be a portable memory device such as a memory card which conforms to one of the SD/MMC, CF, MS and XD specifications, and the host device 130 is another electronic device able to be connected to the memory device 100, such as a cellphone, a laptop, a desktop computer, etc. In another embodiment, the memory device 100 may be a solid state drive (SSD) or an embedded memory device which conforms to the universal flash storage (UFS) specification or embedded Multi Media Card (EMMC) specification, and can be arranged in a cellphone, a laptop or a desktop computer. At this time, the host device 130 can be a processor of the cellphone, a processor of the laptop or a processor of the desktop computer.

Figure 2:
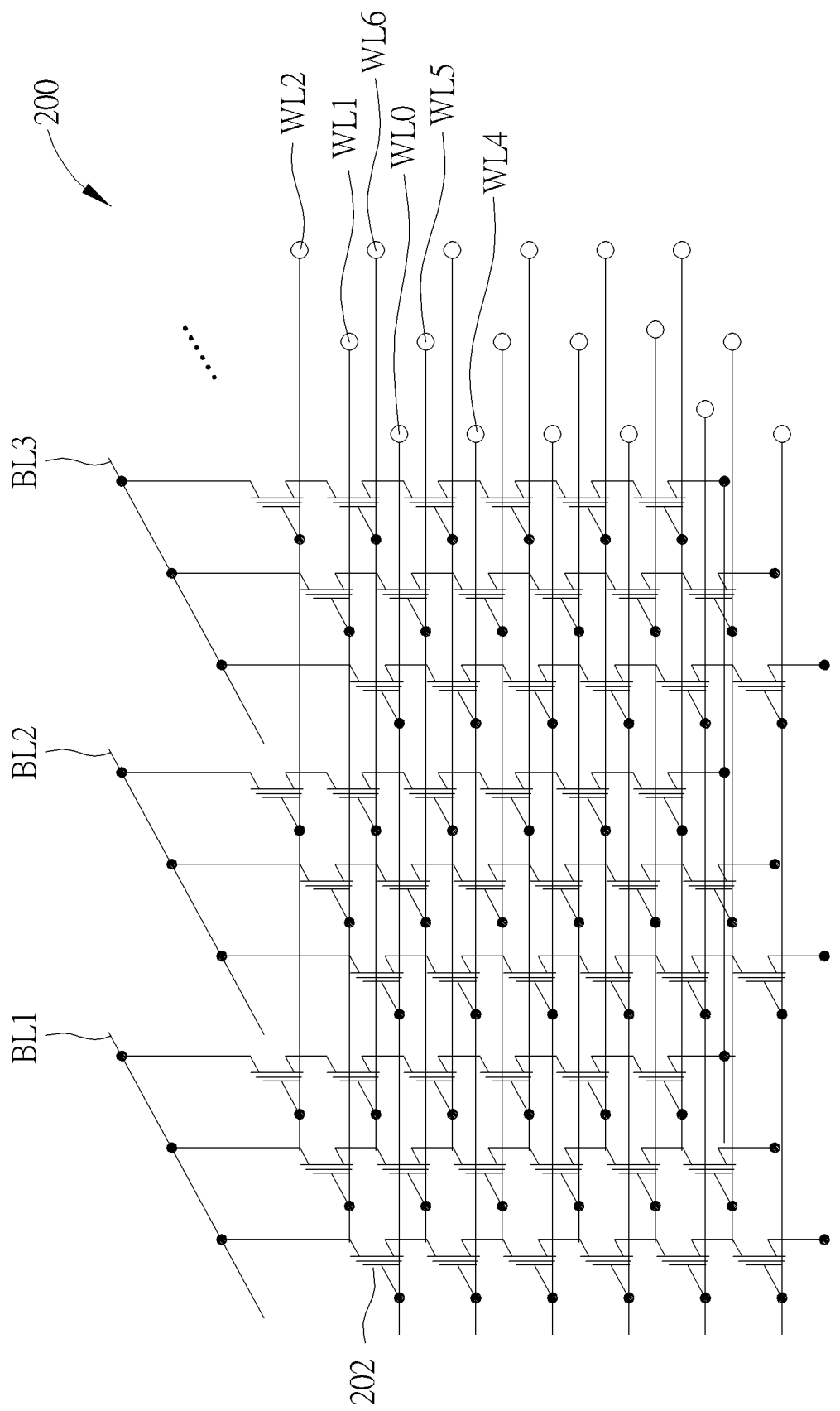
FIG. 2 is a diagram illustrating a block of a flash memory module according to an embodiment of the present invention.

FIG. 2 is a diagram illustrating a block 200 of the flash memory module 120 according to an embodiment of the present invention, wherein the flash memory module 120 is a 3D NAND-type flash memory module. As shown in FIG. 2, the block 200 includes a plurality of memory cells, such as floating gate transistors 202 shown in FIG. 2 or other charge trapping components. A 3D NAND-type flash memory structure is formed through a plurality of bit lines (only BL1-BL3 are shown in FIG. 2) and a plurality of word lines (e.g., WL0-WL2 and WL4-WL6 shown in FIG. 2). Taking a top plane in FIG. 2 as an example, all floating gate transistors on the word line WL0 form at least one page, all floating gate transistors on the word line WL1 format least another one page, and so on. In addition, the definition between the word line WL0 and the page (logic page) may vary depending on a writing method of the flash memory. In detail, when data are stored using a Single-Level cell (SLC) means, all floating gate transistors on the word line WL0 correspond to only one logic page; when data are stored using a Multi-Level cell (MLC) means, all floating gate transistors on the word line WL0 correspond to two logic pages; when data are stored using a Triple-Level cell (TLC) means, all floating gate transistors on the word line WL0 correspond to three logic pages; and when data are stored using a Quad-Level cell (QLC) means, all floating gate transistors on the word line WL0 correspond to four logic pages. The 3D NAND-type flash memory structure and the relationship between word lines and pages are obvious to those skilled in the art. For simplification, no further illustration is provided.

Figure 3:
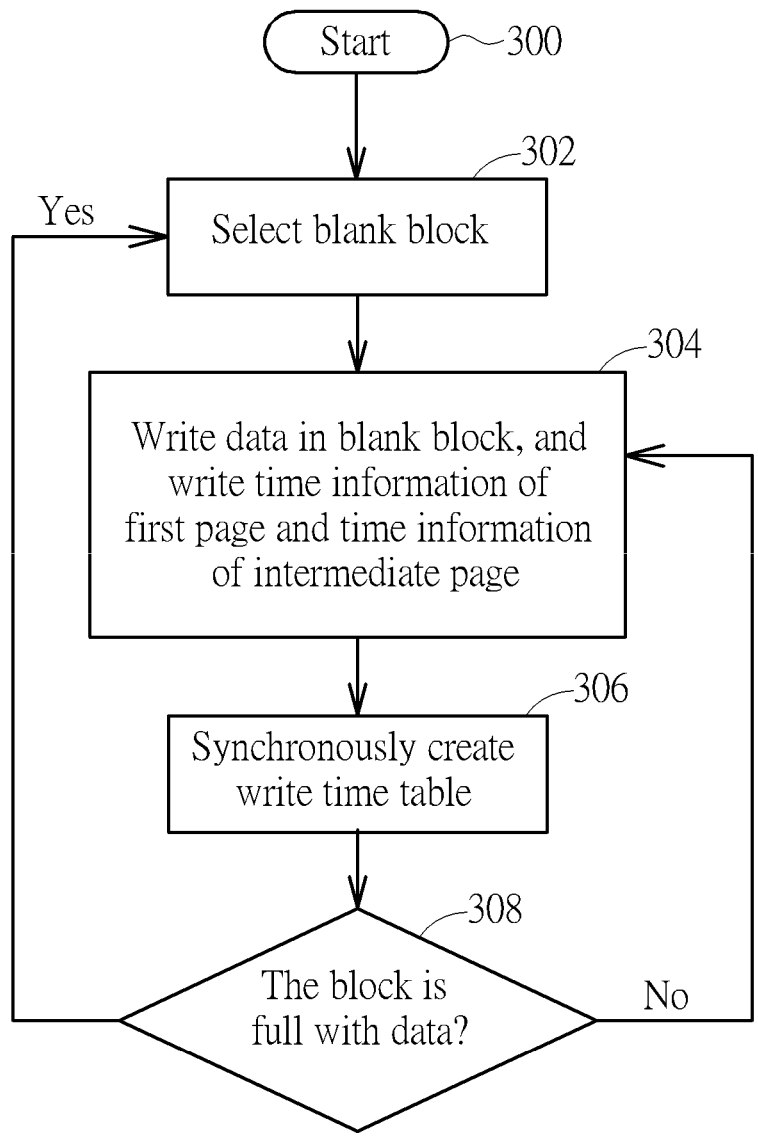
FIG. 3 is a flowchart illustrating creation of a write time table according to an embodiment of the present invention.

FIG. 3 is a flowchart illustrating creation of a write time table according to an embodiment of the present invention. In Step 300, the flow starts, and the flash memory controller 110 is powered on and performs an initialization operation. In step 302, the flash memory controller 110 selects a block from a plurality of blank blocks in the flash memory module 120, and prepares to write data from the host device 130 into the block. In step 304, the flash memory controller 110 starts writing data from a first page of the block, and writes current time information into a spare area when the data is written into the first page. In practice, referring to the diagram of the flash memory module 120 shown in FIG. 4 and assuming a block B1 includes a plurality of pages P1-P256, the flash memory controller 110 writes data from host device 130 into the first page of the block B1 in sequence, wherein when the flash memory controller 110 is ready to write data to the page P1, the flash memory controller 110 simultaneously obtains a current time information T1_1, for example, set by an internal timer or an absolute time from the host device 130 (for example, 2 μm on May 11, 2020) to generate the corresponding time information, and write the data from the host device 130 and the related time information T1_1 into the page P1, wherein the time information T1_1 can be written in the spare area located on a back end of the page P1.

In an embodiment, the flash memory controller 110 may also write the corresponding time information into the spare area when data is written into an intermediate page. Specifically, when the flash memory controller 110 is ready to write the data to the intermediate page P128, the flash memory controller 110 simultaneously retrieves current time information T1_M and writes the data from the host device and the relevant time information T1_M into the page P128 together. The time information T1_M can be written into the spare area located at a back-end of the page P128. It should be noticed that the pages P2 to P127 between the first page P1 and the intermediate page P128 may not need to record any time information, to reduce the burden on the flash memory controller 110. It should be noticed that the above-mentioned spare area of the page can also be called the management area, that is, it is configured to store some management data, such as logical addresses, etc.

Figure 4:
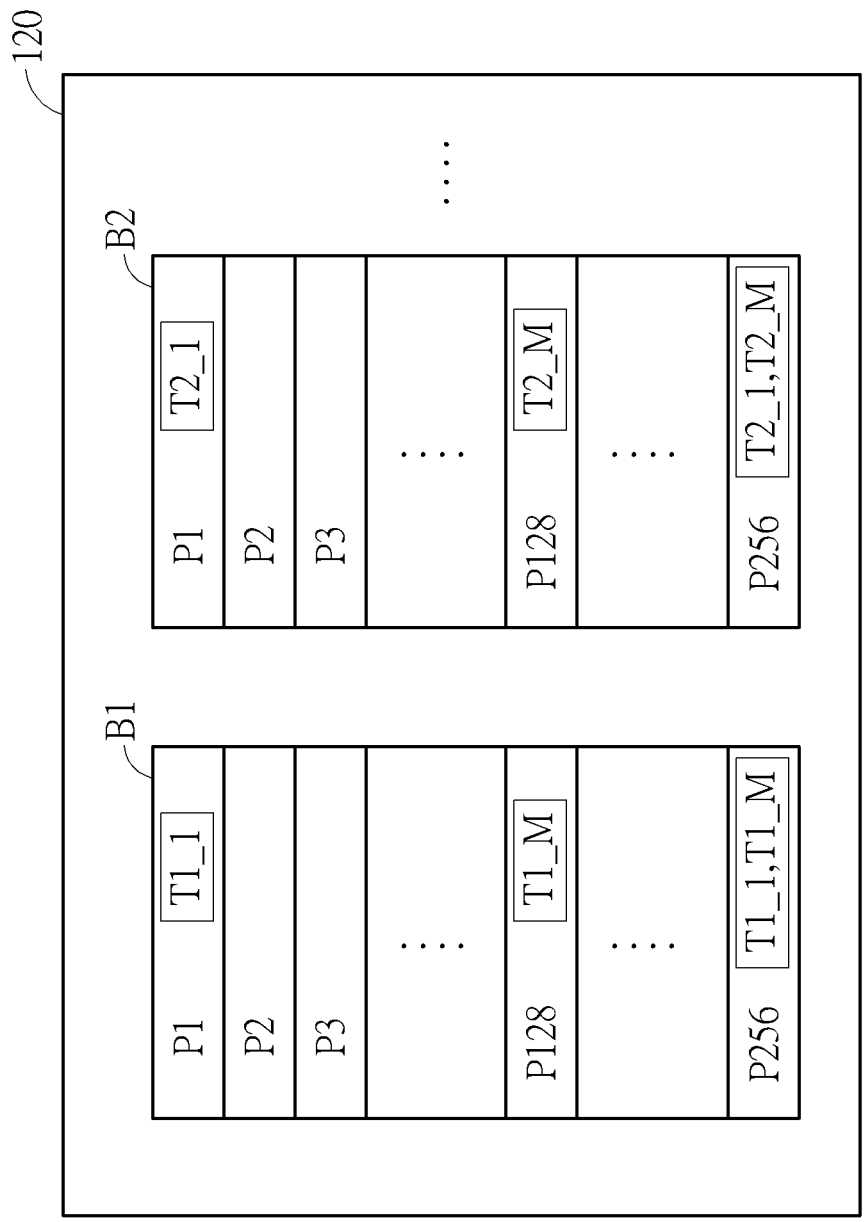
FIG. 4 is a diagram illustrating time information being written in a block.

It should be noticed that, in the embodiment of FIG. 4, the page P128 being used as the intermediate page is for illustrative purposes only, and the present invention is not limited thereto. In another embodiment, the page P127 can also be used as the intermediate page, or the pages P127 and P128 can be both used as the intermediate pages. In addition, in another embodiment, a plurality of pages may be used as intermediate pages. For example, the four pages P126, P127, P128 and P129 are all used as the multiple intermediate pages described in this embodiment. That is, the spare areas of the pages P126, P127, P128 and P129 all store the corresponding time information.

Furthermore, the flash memory controller 110 sequentially writes data to the pages P129, P130, and so on. When the flash memory controller 110 is ready to write the data to the last page (e.g., a page P256), the flash memory controller 110 writes the time information T1_1 of the previous page P1 into the page P256 together with the data from the host device 130. The time information T1_M can be written to the spare area located at a back end of the page P256. In one embodiment, as shown in FIG. 4, the flash memory controller 110 combines the time information T1_1 of the first page P1 and the time information T1_M of the intermediate page P128 together with the data from the host device 130 into the page P256.

In step 306, in the process of writing data in the block B1, the flash memory controller 110 will synchronously create a write time table 500 as shown in FIG. 5 in the DRAM 140, that is, the write time table 500 records at least the block number B1 and the corresponding time information T1_1. In one embodiment, the write time table 500 records the block number B1 and the corresponding time information T1_1 and T1_M. It should be noticed that what is recorded in the write time table 500 is the time information T1_1 of the first page P1 and the time information T1_M. of the intermediate page (e.g., the page P128). If there are multiple intermediate pages (e.g., four pages P126, P127, P128 and P129 all used as the intermediate pages) set in each block as described in the previous paragraph, the write time table 500 can generate single time information of the intermediate page according to the multiple time information recorded by the pages P126, P127, P128 and P129. For example, the single time information corresponding to the intermediate page may be set by an average value of the multiple time information recorded in the pages P126, P127, P128 and P129, or set by a median value selected from the multiple time information recorded in the pages P126, P127, P128 and P129.

It should be noticed that, regarding some memory devices which do not have the DRAM 140, the above-mentioned write time table 500 may be stored in the buffer memory 116.

In step 308, the microprocessor 112 determines whether all pages of the block B1 are full with data. If No, the flow proceeds with step 304 to continue writing data to the remaining pages of the block B1; if Yes, the flow proceeds with step 302 to select a next blank block, such as a block B2 shown in FIG. 4. Then, similar to the data writing process of the flash memory controller 110 writing data to the block B1, when the flash memory controller 110 is ready to write data to the page P1 of block B2, the flash memory controller 110 simultaneously obtains the current time information T2_1, and writes both of the data from the host device 130 and the related time information T2_1 to the page P1 of the block B2; when the flash memory controller 110 is ready to write data to the page P128 of block B2, the flash memory controller 110 simultaneously obtains the current time information T2_M, and writes both of the data from the host device 130 and the related time information T2_M to the page P128 of the block B2; and when the flash memory controller 110 is ready to write data to the page P256, the flash memory controller 110 writes all of the previous time information T2_1 of the page P1, the time information T2_M of the page P128 and the data from the host device 130 to the page P256. In addition, the microprocessor 112 updates the write time table 500 to record the block number B2 and the corresponding time information T2_1 and T2_M.

Whenever there is a blank block in the flash memory module 120 that starts storing data, the microprocessor 112 updates the write time table 500. That is, the write time table 500 records at least the time information of the first page P1 of each block. In one embodiment, the write time table 500 also records the time information of the intermediate page (e.g., the page P128).

In addition, the write time table 500 stays resident in the DRAM 140 to facilitate the expired block judgment operation or the garbage collection operation. When the memory device 100 requires being powered off, the microprocessor 112 writes the write time table 500 to the flash memory module 120 in advance. The write time table 500 is not read from the flash memory module 120 and loaded into the DRAM 140 for subsequent use until the memory device 100 is powered on.

When the flash memory module 120 uses a flash memory chip with a multi-layer stack structure, a data retention time of the flash memory chip is bad, that is, the quality of the data will decline rapidly after a few weeks (for example, 2-3 weeks) since the data is written, causing the data difficult to be decoded or even unreadable. Therefore, the write time table 500 of the above embodiment can be used to quickly allow the microprocessor 112 to know the block quality, so as to perform the expired block recycling operation on the blocks each having a write time which is too long ago, to prevent the data in the block from losing due to being stored for a long time.

In addition, in some applications, the flash memory module 120 will have thousands of blocks, and these blocks are frequently written. Therefore, the write time table 500 is required to record many block numbers and related time information, such that the storage space of the DRAM 140 is severely consumed. In addition, if the memory device 100 does not have the DRAM 140 and the write time table 500 needs to be stored in the buffer memory 116, then the buffer memory 116 is usually implemented with an SRAM which is more expensive and does not have large capacity. Therefore, it is hard to do memory arrangement on the buffer memory 116. To address above issues, the following embodiments provide a compression method of the write time table 500, which can write most of the content of the write time table 500 to blocks of the flash memory module 120, to reduce the size of the write time table 500 stored in the DRAM 140 or the buffer memory 116.

Figure 6A:
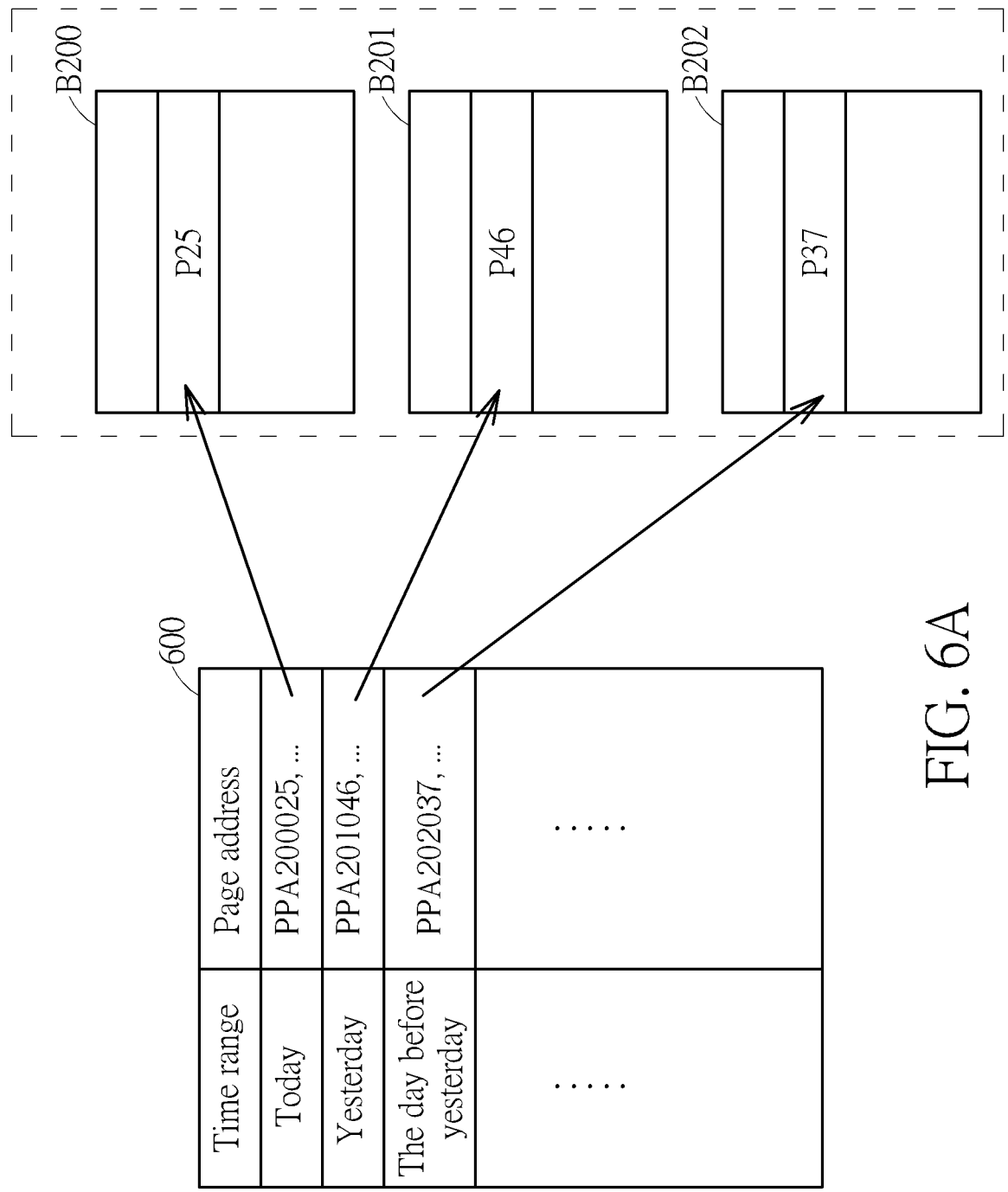
FIG. 6A is a diagram illustrating a compressed write timetable according to an embodiment of the present invention.

For example, referring to a diagram of the compressed write time table 600 shown in FIG. 6A, the compressed write time table 600 can be generated by simplifying and compressing the write time table 500. In FIG. 6A, the compressed write time table 600 includes multiple time ranges and corresponding page addresses, wherein the multiple time ranges can be any appropriate time ranges, and the preferred time ranges can be in a range from half a day to two days. In the present embodiment, the time ranges are day-based. In the embodiment of FIG. 6A, the microprocessor 112 sequentially or periodically writes the block numbers and the corresponding time information in the write time table 500 into the blocks of the flash memory module 120. Taking the time range "today" in FIG. 6A as an example for illustration, the flash memory controller 110 writes data to multiple blocks of the flash memory module 120, and synchronously creates the write time table 500. If the amount of data in the write time table 500 reaches the capacity of one page of flash memory module 120, the microprocessor 112 can write the block numbers and corresponding time information in the write time table 500 to a page P25 of a block B200 (or can record only the block numbers without recording the corresponding time information), and the compressed write time table 600 records the physical page address "PPA200025" of the page P25 of the block B200. It should be noticed that the compressed write time table 600 stored in DRAM 140 can be regarded as an index. This index allows the microprocessor 112 to easily find a physical page address at which the write time table 500 is stored, and then the microprocessor 112 can read complete content of the write time table 500 according to the physical page address "PPA200025" which is obtained by looking up the compressed write time table 600. In addition, since the page P25 of the block B200 records the content of the write time table 500, the microprocessor 112 can delete the relevant data in the write time table 500 to release memory space. In the same way, the page address "PPA201046" recorded for the time range "yesterday" shown in FIG. 6A corresponds to a page P46 of a block B201, and the page P46 of the block B201 records block numbers of blocks written yesterday and the corresponding time information. In the same way, the page address "PPA202037" recorded for the time range "the day before yesterday" shown in FIG. 6A corresponds to a page P37 of a block B202, and the data page P37 of the block B202 records block numbers of blocks written the day before yesterday and the corresponding time information. Therefore, since the content of the write time table 500 shown in FIG. 5 can be stored in the flash memory module 120, and the compressed write time table 600 only needs to record some page addresses in the flash memory module 120, the memory space requirement of the write time table 500 can be effectively relieved.

In practice, time ranges "today", "yesterday", and "the day before yesterday" in the compressed write time table 600 are absolute time ranges. For example, the time range "today" is from 00:00 to 24:00 on May 21, 2020, the time range "Yesterday" is from 00:00 to 24:00 on May 20, 2020, and the time range "the day before yesterday" is from 00:00 to 24:00 on May 19, 2020.

Figure 6B:
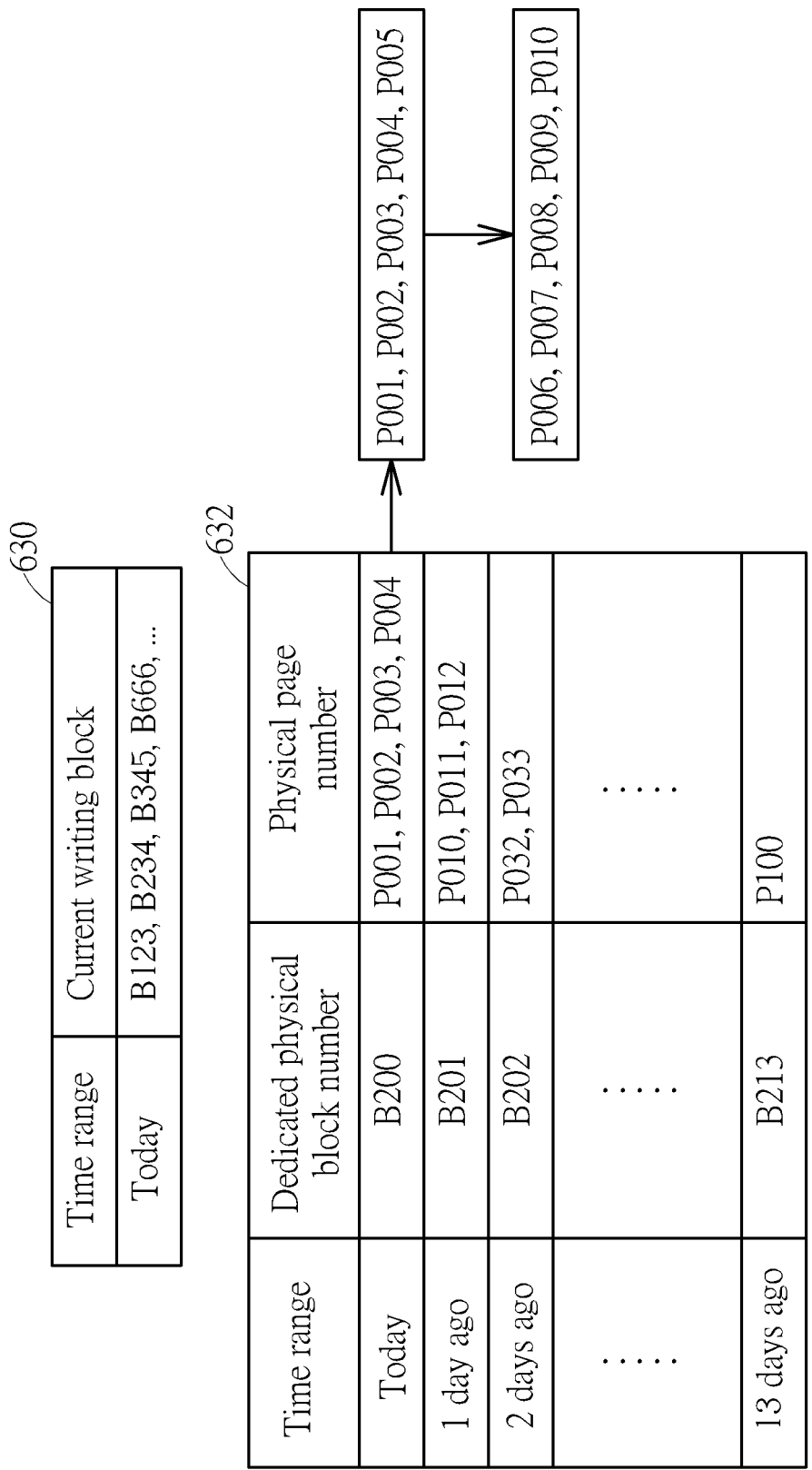
FIG. 6B is a diagram illustrating a current write block time table and an expired recycling block index table according to an embodiment of the present invention.

In addition, in order to facilitate the management of blocks and pages, each time range in the compressed write time table 600 corresponds to a dedicated block. For example, the block numbers and the time information of all blocks which have data written the day before yesterday (2 days ago) are written into the block B202, the block numbers and the time information of all blocks which have data written yesterday (1 day ago) are written to the block B201, the block numbers and the time information of all blocks which have data written today are written to the block B200, and so on. In addition, the above-mentioned dedicated block will not be used to store other data. If the dedicated block is used for recording, the content that needs to be recorded can be further simplified. Please refer to FIG. 6B. FIG. 6B illustrates a current writing block table 630 and an expired recycling block index table 632 that can be used as an example of the compressed write time table. The expired recycling block index table 632 and the current writing block table 630 can exist in the DRAM 140. The current writing block table 630 includes a time range field and a current writing block field. The expired recycling block index table 632 includes a time range field, a dedicated physical block number field and a physical page number field. The time range field of the current writing block table 630 can be fixed to "today". Alternatively, the time range field can be omitted for further saving the required memory space. The time ranges can be determined by the sorting order. For example, the first time range is today, the second time range is 1 day ago, the third time range is 2 days ago, and so on. The current writing block table 630 is used to store the physical block numbers of blocks written by the flash memory controller 110 in a specific time range such as today. For example, as shown in FIG. 6B, the block B123, the block B234, the block B345, the block B666, etc. are written today. When the amount of data recorded in the current writing block table 630 has reach one writing unit of flash memory (e.g., one page), the flash memory controller 110 writes the data into the flash memory module 120. The content in the current writing block field is not deleted until the data is successfully written into the flash memory module 120. The flash memory controller 110 can write block numbers of blocks B123, B234, B345 and B666 into the fourth page P004 of today's dedicated physical block B200, and updates the dedicated physical page number field corresponding to the time rage "today" in the expired recycling block index table 632 by page numbers P001, P002, P003 and P004. A dedicated physical block number field indicates a dedicated block in which block numbers of blocks written at a specific time should be stored. For example, block numbers of blocks written today should be stored in the block B200, block numbers of blocks written one day ago should be stored in the block B201, and block numbers of blocks written two days ago should be stored in the block B202. The physical page number field indicates dedicated block's specific pages in which block numbers of blocks written at a specific time should be stored. For example, block numbers of blocks written today are stored in the physical pages P001, P002, P003, and P004 of the block B200. If more blocks are written today and the amount of data recorded in the current writing block table 630 reaches one page of flash memory again, then these block numbers should be continually written to the page P005 of the block B200, and the flash memory controller 110 updates the physical page number field corresponding to the time range "today" in the expired recycling block index table 632 by recording page numbers P001, P002, P003, P004 and P005.

In one embodiment, the flash memory controller 110 may erase previously written blocks. For example, the previously written blocks B123, B234, and B345 may be erased. These erased blocks do not need to do the expired block recycling operation. Therefore, the contents of the expired recycling block index table 632 and the dedicated block B200 need to be updated. Before the flash memory controller 110 erases the block B123, the block B234 and the block B345, the flash memory controller 110 can find that these blocks were written today according to the write time recorded in the pages P1 or the intermediate pages of the block B123, the block B234 and the block B345, and then further looks up the expired recycling block index table 632 to find that the blocks written today are recorded in the physical pages P001, P002, P003, P004 and P005 of the dedicated physical block B200. The flash memory controller 110 reads the physical pages P001, P002, P003, P004 and P005 of the dedicated physical block B200, to obtain the physical block numbers written today, and deletes block numbers of the blocks B123, B234, and B345 to be erased from the read physical block numbers, and then writes the remaining physical block numbers into the physical pages P006, P007, P008, P009 and P010 of the dedicated physical block B200. The flash memory controller 110 updates the content of the expired recycling block index table 632, updates the block numbers written today, and updates the content of the physical page number field corresponding to the time range "today" by recording page numbers P006, P007, P008, P009 and P010. It should be noticed that if the host frequently updates data and causes the dedicated block B200 to be fully-filled, the flash memory controller 110 can select other block (such as the block B300) as today's dedicated block, writes the valid data in the original block B200 into the new dedicated block B300, and updates the content of the expired recycling block index table 632 for updating the dedicated block corresponding to the time rage "today" to the block B300. Similarly, the update methods for dedicated blocks of other time ranges are similar to the update method for today's dedicated block, and further description is omitted here for simplicity.

Since the expired recycling block index table 632 records a single dedicated physical block number and the page numbers of the dedicated physical block, the required memory space is smaller than that of the compressed write time table 600 which requires recording the complete page addresses. Furthermore, since the dedicated block is used to record the blocks written in a specific time range, it is more convenient in management, and it is easier to write, update and query.

In one embodiment, the memory space required by an expired recycling block index table 652 can be further reduced. Please refer to FIG. 6C. FIG. 6C illustrates the expired recycling block index table 652. The expired recycling block index table 652 may exist in the DRAM 140. The expired recycling block index table 652 includes a time range field, a dedicated physical block number field, and a physical page number field. The recording and operation of the expired recycling block index table 652 is similar to that of the expired recycling block index table 632. The main difference is that the physical page number field of the expired recycling block index table 652 only records the range of pages with valid data in the dedicated physical block. For example, block numbers of the blocks written today are stored in the pages P001 to P004 of the dedicated physical block B200. When the flash memory controller 110 needs to query all the blocks written today, the flash memory controller 110 can use the expired recycling block index table 652 to find the block numbers are stored in the pages P001 to P004 of the block B200. The flash memory controller 110 can read all the block numbers written today from the data pages P001 to P004 of the block B200. Since only the range of pages with valid data in the dedicated block is recorded, the expired recycling block index table 652 can further save memory space. It should be noticed that if a storage space of only one page is needed to record all block numbers of blocks written in this time range, the recording manner for the time range "13 days ago" in the expired recycling block index table 652 can be referred, to record the page numbers P100, P100, which represents that the range of pages with valid information in the block is page P100 to page P100.

One advantage of using dedicated blocks for time recording is that it is easier to recycle expired blocks. For example, the algorithm for expired block recycling can be designed to recycle all the blocks written the day before yesterday. At this time, it is only needed to find out physical page numbers in a dedicated block (such as a dedicated block corresponding to the time range "the day before yesterday") according to the expired recycling block index table 652, read the pages that records block numbers of blocks that have not yet been recycled, and then perform expired block recycling operation on these blocks.

In addition, since the blocks in the flash memory module 120 may be erased and then become blank blocks, when the microprocessor 112 knows that a block has been erased, the content of the flash memory module 120 and the compressed write time table 600 are updated. Specifically, please refer to the flowchart shown in FIG. 7 for updating the compressed write time table 600 and related content. In step 700, the flow starts. In step 702, the microprocessor 112 determines whether there is a block in the flash memory module 120 to be erased. If Yes, the flow proceeds with step 704; if No, the flow holds in step 702. In step 704, the microprocessor 112 determines which time range shown in FIG. 6A that the block to be erased corresponds to. For example, the microprocessor 112 may first read the time information recorded on the first page of the block to be erased, to determine which time range the block corresponds to. In the following embodiments, please refer to FIG. 7 in conjunction with the diagram shown in FIG. 8, for the convenience of illustration. Assume that the microprocessor 112 writes data to multiple blocks B60 to B90 when the time range is "yesterday", and the page P46 of the block (dedicated to "yesterday") B201 records the time information of each of the blocks B60 to B90, such as the time information of the first page of each block of the blocks B60 to B90. In this embodiment, it is assumed that the blocks to be erased are blocks B71-B74.

In step 706, according to the time range determined in step 704, the microprocessor 112 reads the last written one or more pages of the dedicated block corresponding to the time range according to the page address recorded in the compressed write time table 600. In this example, the microprocessor 112 reads the last written page P46 of the block B201, where the page P46 records the time information of each block of the blocks B60 to B90, and the microprocessor 112 temporarily stores the time information of the blocks B60 to B90 in the buffer memory 116 or the DRAM 140.

In step 708, the microprocessor 112 erases the contents of the blocks B71 to B74 or marks the blocks B71 to B74 as invalid blocks, and then the microprocessor 112 deletes the time information of the blocks B71 to B74 from the buffer memory 116 or the DRAM 140.

In step 710, the microprocessor 112 writes the updated content, that is, the time information of the blocks B60 to B70, B75 to B90 to the page P47 of the block B201, and records that the content of the page P46 of the block B201 includes invalid data.

After the page P47 of block B201 is written, the microprocessor 112 updates the content of the compressed write time table 600 (step 712), that is, the page address "PPA201046" corresponding to the time range "yesterday" shown in FIG. 6A is replaced by the page address of the page P47 of block B201. After the step, the flow proceeds with step 702.

As mentioned above, through the flow shown in FIG. 7, the last content written in one or more pages in the dedicated block corresponding to each time range is the latest data. The content recorded in the previous data page becomes invalid data, to facilitate subsequent management.

Figure 9:
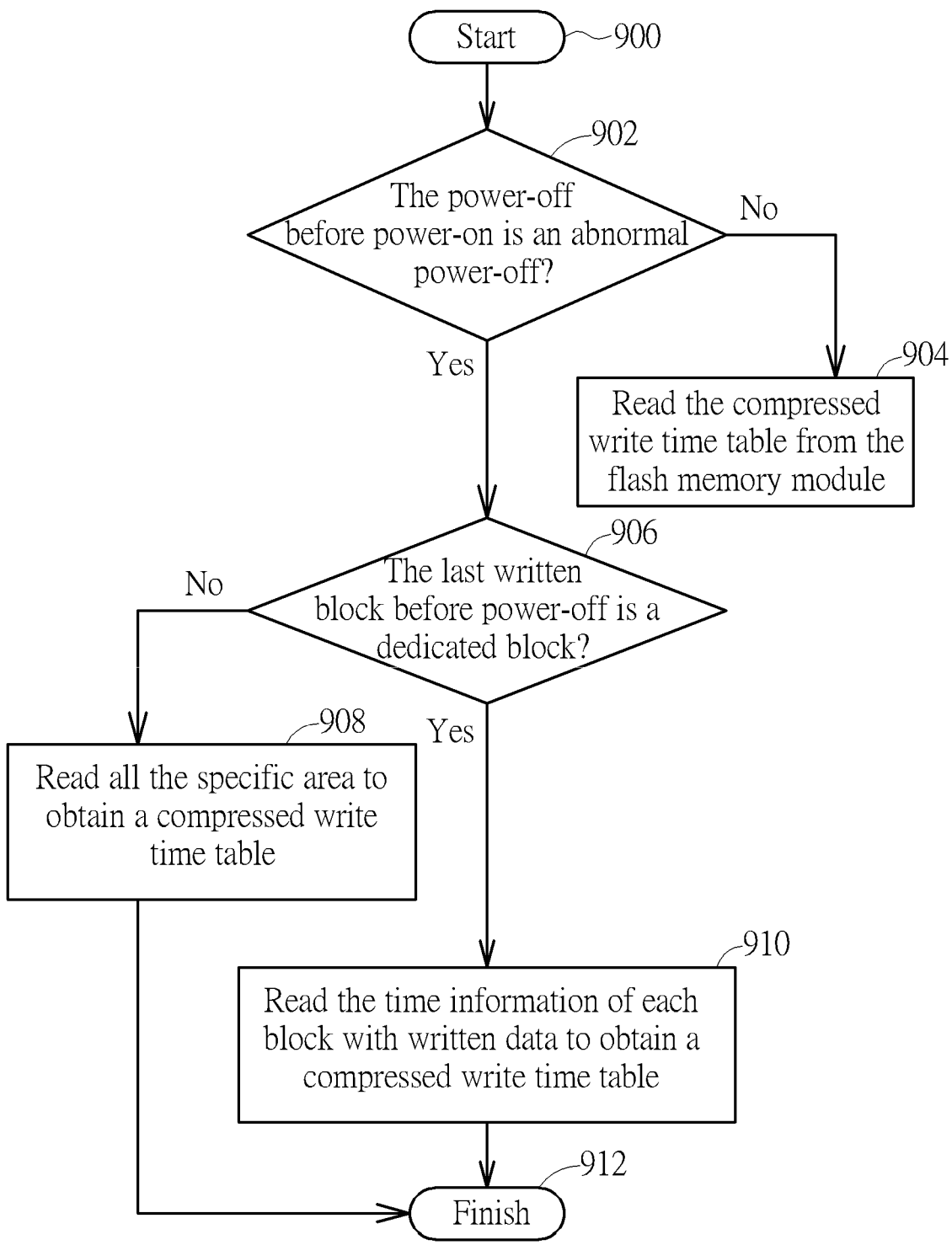
FIG. 9 is a flowchart of creating the write time table in a DRAM after the memory device is powered on according to an embodiment of the present invention.

In addition, the memory device 100 may be suddenly powered off because of various reasons, and the compressed write time table 600 stored in the DRAM 140 may be lost. Therefore, after the memory device 100 is powered on again, the compressed write time table 600 requires being re-created in the DRAM 140. Please refer to FIG. 9 that illustrates the flowchart of creating the compressed write time table 600 in the DRAM 140 after the memory device 100 is powered on according to an embodiment of the present invention. In step 900, the flow starts, and the memory device 100 is powered on and performs an initialization operation. In step 902, the microprocessor 112 determines whether power-off of the memory device 100 before power-on is an abnormal power-off (sudden power-off). If No, the flow proceeds with step 904 to read the compressed write time table 600 from the flash memory module 120 and temporarily store the compressed write time table 600 in the DRAM 140. If Yes, the flow proceeds with step 906. For example, when the memory device 100 is normally shut down/powered off, the flash memory controller 110 stores multiple temporary tables (including the compressed write time table 600) and data stored in the buffer memory 116 into the flash memory module 120, wherein the data includes a flag indicating whether the memory device 100 is normally shut down. Therefore, after the flash memory controller 110 is powered on, the above-mentioned flag stored in the flash memory module 120 can be read to determine whether the memory device 100 has experienced abnormal power-off before. For example, when the above-mentioned flag has not been set correctly, it is determined that there has been an abnormal power-off before. In step 906, the microprocessor 112 determines whether the last written block of the memory device 100 before power-off of the memory device 100 (which is prior to the current power-on of the memory device 100) is a dedicated block used to store the time information of the block, such as the blocks B200, B201 and B202 shown in FIG. 6A. If No, the flow proceeds with step 908; if Yes, the flow proceeds with step 910. It should be noticed that the last written block before the power-off of the memory device 100 (which is prior to the current power-on of the memory device 100) can be obtained by scanning blocks during the initialization process of the flash memory controller 110.

In step 908, assuming that the dedicated blocks used to store the time information of the blocks (such as blocks B200, B201 and B202 shown in FIG. 6A) are located in a specific area in the flash memory module 120. Therefore, the microprocessor 112 can directly read all the blocks in the specific area (e.g., can read multiple blocks' time information recorded in the last one or more pages of all the blocks in the specific area) to obtain a table similar to the write time table 500 shown in FIG. 5, without reading all the blocks in the entire flash memory module 120. Then the microprocessor 112 compresses the write time table 500 to obtain a compressed write time table (or an expired recycling block index table) similar to the compressed write time table 600 shown in FIG. 6A (or the expired recycling block index tables 632 and 652 shown in FIG. 6B and FIG. 6C).

In step 910, the abnormally power-off may cause data damage to the blocks which the flash memory module 120 normally writes data into. Therefore, if the last written block before the power-off of the memory device 100 (which is prior to the current power-on of the memory device 100) is a dedicated block used to store the time information of blocks, the microprocessor 112 sequentially reads the first page or the last page (e.g., the page P256 shown in FIG. 4) of each block with written data in the flash memory module 120, to obtain the time information of the first page of each block and/or the time information of the intermediate page of each block, for further obtaining a write time table similar to the write timetable 500 shown in FIG. 5.

After obtaining the time information of each block with written data to recreate the compressed write time table 600 in the DRAM 140, the flow proceeds with step 912 to end the operation.

Figure 10:
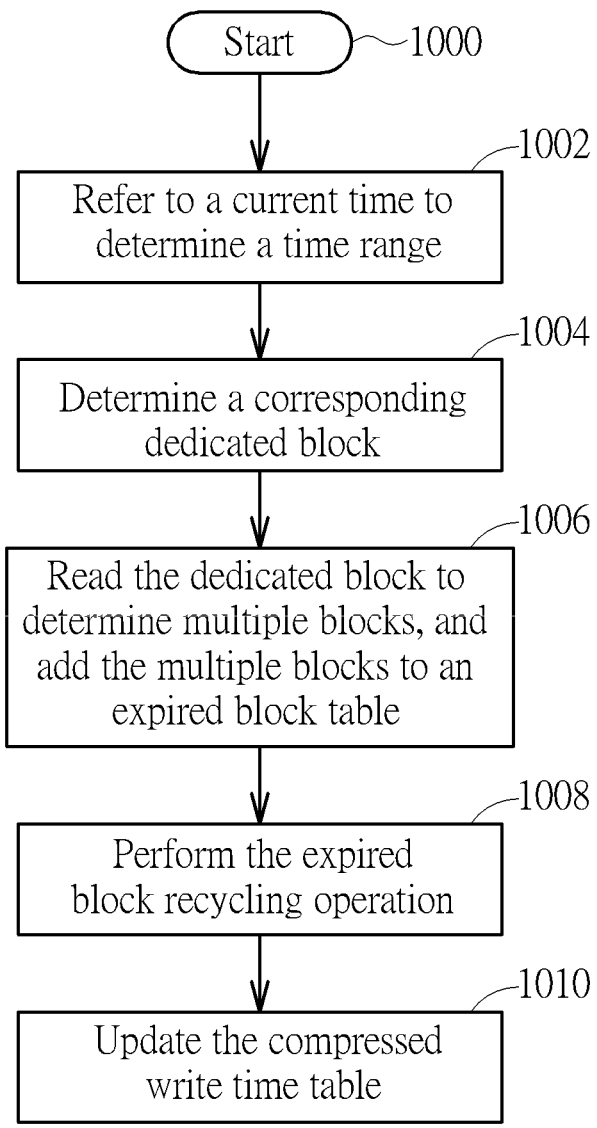
FIG. 10 is a flowchart illustrating an expired block recycling operation according to an embodiment of the present invention.

FIG. 10 is a flowchart illustrating an expired block recycling operation according to an embodiment of the present invention. In step 1000, the flow starts, and the memory device 100 has completed the initialization operation. In step 1002, the microprocessor 112 refers to a current time to determine at least one time range. For example, assuming an experimental measurement result shows that the data written into the flash memory module 120 will be degraded significantly after 14 days, the time range that the microprocessor 112 can select is "13 days ago". In step 1004, the microprocessor 112 selects a dedicated block corresponding to the time range "13 days ago" according to the page address recorded in the compressed write time table 600.

In step 1006, the microprocessor 112 reads the dedicated block determined in step 1004 to determine multiple blocks with data written 13 days ago, adds the multiple blocks to an expired block table (e.g., records the block numbers of these blocks in the expired block table), and marks these blocks as blocks to be processed. In this embodiment, the expired block table is used to record the priority order of expired block recycling, and the expired block table has a fixed size (that is, the number of blocks that can be recorded has an upper limit). Therefore, if the number of the multiple blocks is too large, the block with the earlier time information of the first page P1 can be selected to be added to the expired block table, and the time information of the intermediate page can also be used as an alternative reference. For example, the microprocessor 112 can refer to the time information in the first pages P1 of the multiple blocks with data written 13 days ago to add block (s) with the time information earlier than a first threshold into the expired block table, and then refer to the time information in the intermediate pages P128 of the multiple blocks to add block (s) with the time information earlier than a second threshold into the expired block table according to the time information in the intermediate page P128 in the multiple blocks, wherein the second threshold is later than the first threshold.

In step 1008, the microprocessor 112 sequentially performs the expired block recycling operation according to the blocks recorded in the above-mentioned expired block table. Specifically, the microprocessor 112 can move the valid data in the block recorded in the expired block table to a blank page, and mark the block as invalid or erase the block after the valid data of the block is completely moved. It should be noted that the expired block recycling operation described in step 1008 can be performed as a background program. That is, when the flash memory controller 110 is in an idle state (for example, there is no need to process an access command from the host device 130), the microprocessor 112 can start to perform the expired block recycling operation until the flash memory controller 110 receives an access command from the host device 130 and needs to be in a busy state.

Figure 7:
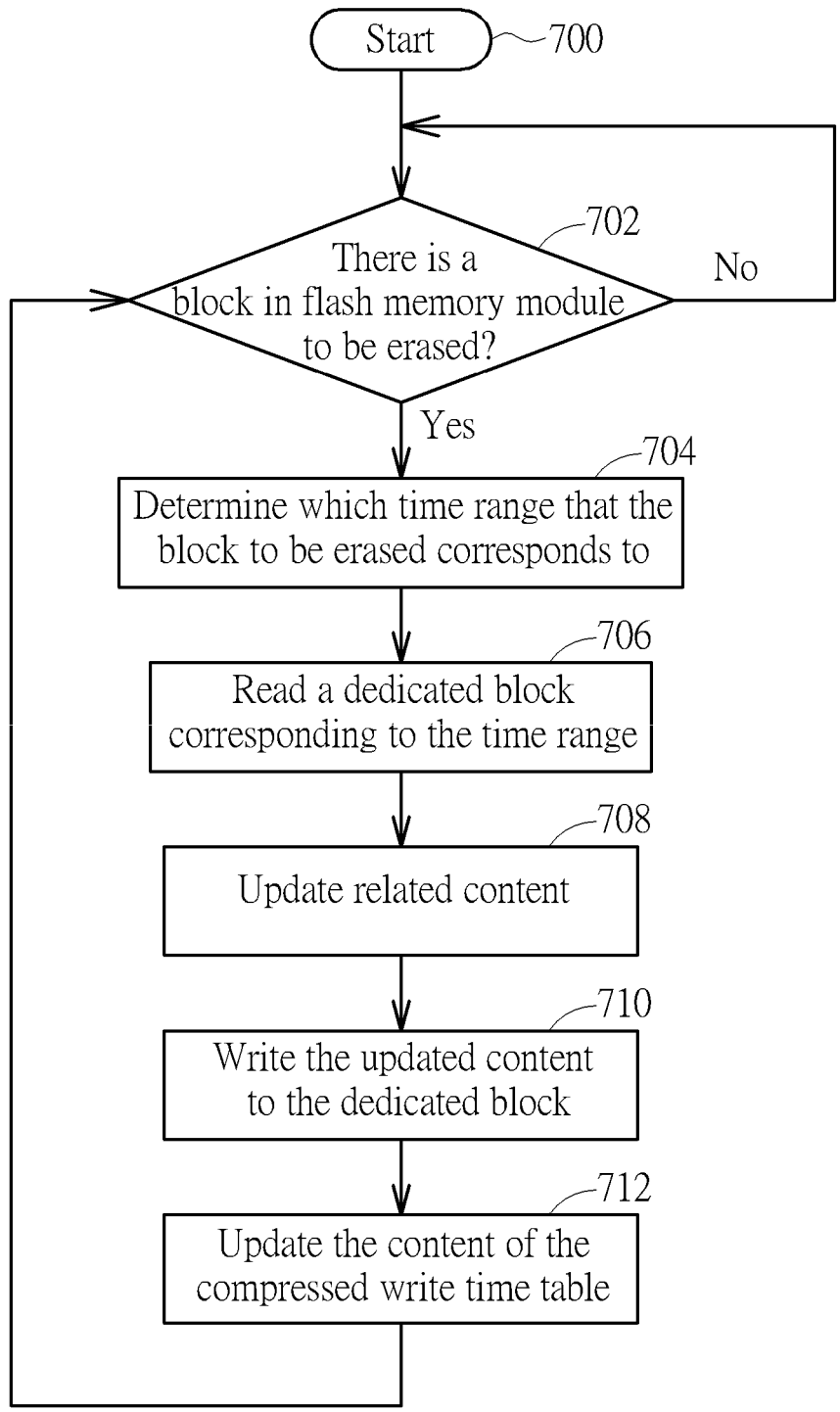
FIG. 7 is a flowchart illustrating the write time table being updated according to an embodiment of the present invention.
Figure 8:
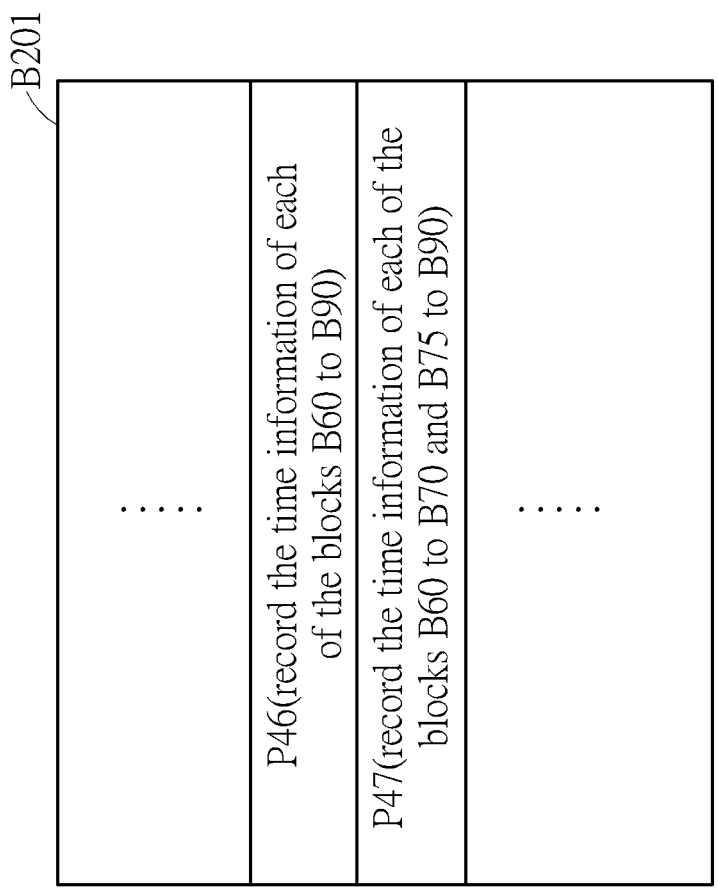
FIG. 8 is a diagram illustrating the time information of a dedicated block being updated.

In step 1010, since step 1008 performs block writing and erasing during the expired block recycling operation, the microprocessor 112 updates the compressed write time table 600 according to the above-mentioned block writing and erasing, as shown in the flow in FIG. 7.

Since the density of the memory capacity of the 3D NAND flash memory is continuously increasing, performance of the 3D NAND flash memory is continuously degraded. Charges stored in a gate of a memory cell of a new type 3D NAND flash memory will be continually lost after the data is written. After a period of time, the charges stored in gates of some memory cells do not represent the charges of original data any more, such that errors often occur when the memory cells are read. These errors usually cause the flash memory controller to start some correction mechanisms such as changing the read voltage and hard decoding and soft decoding, such that correct data can be read from the expired blocks. These correction mechanisms are usually very time-consuming and power-consuming, and may not be able to correct the error at all, which makes the flash memory controller fail to read the correct data. Therefore, it is necessary to record a write time of the block to avoid the above-mentioned problems. It should be noticed that the expired block recycling operation described in the above embodiment is different from the garbage collection operation, and the expired block table in this embodiment is also different from the garbage collection sequence required for the garbage collection operation. In detail, during the operation of the memory device 100, the flash memory controller 110 continually determines the current number of valid pages in each block of the flash memory module 120, to further determine which block requires undergoing the garbage collected operation. For example, when a number of valid pages of a block is lower than a threshold, the block is listed into the garbage collection sequence for undergoing subsequent garbage collection operation. However, the expired block table described in this embodiment records blocks each having a write time which is too long ago. Hence, some of these blocks may not reach a criterion of the garbage collection operation. For example, the number of valid pages for the block may be much greater than the threshold. In addition, since the data of the blocks recorded in the expired block table is about to deteriorate very soon, the priority of the expired block table is higher than that of the garbage collection sequence. That is, if there is any block number recorded in the expired block table, the flash memory controller 110 stops the garbage collection operation and starts to perform the expired block collection operation under a condition that the garbage collection operation is allowed to be interrupted. In other words, the flash memory controller 110 will immediately perform the expired block recycling operation on the blocks recorded in the expired block table.

Referring to the embodiment above, the write time table 500 is created to record the time information of the first page and intermediate page of each block, and compresses the write time table 500 to generate the compressed write time table 600. Overall, selecting blocks that require expired block recycling operation is faster and more efficient, and no excess storage space in the buffer memory 116 or the DRAM 140 is occupied.

In addition, the expired block recycling operation requires cooperating with a link table of logical pages and physical pages, to find all valid pages in the block and to move the valid pages from the expired block to a new block. Since the data move operation causes the data in the valid page to be rewritten to the new block, the validity period of these data is reset, and the expired block is erased for use. After moving the valid data, the microprocessor 112 requires updating the link table of logical pages and physical pages, and creates a data number table of valid pages of the new block. To be cautious, the invalid data in the expired block can also be moved to another new block, and a link table of logical pages and physical pages can be created for the invalid data accordingly, thereby allowing data recovery when the host device deletes the data by mistake. It should be noticed that, in some expired blocks, all pages may be valid pages, and all the data have to be moved to the new block and the validity period of all the data has to be reset.

To briefly summarize the present invention, in the control method of the present invention applied to a flash memory controller, the write time table 500 is created to record the time information of the first page and the intermediate page of each block, and then the write time table 500 is compressed to generate the compressed write time table 600. Overall, selecting blocks that require expired block recycling operation is faster and more efficient, and no excess storage space in the buffer memory 116 or the DRAM 140 is occupied.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method applied to a flash memory controller, wherein the flash memory controller is configured to access a flash memory module, the flash memory module comprises a plurality of blocks, and each block comprises a plurality of pages; the control method comprising:
when data is written to any block of the flash memory module, recording a write time in the block;
creating a write time table, wherein the write time table records block numbers of blocks having data written therein and corresponding write time;
compressing the write time table to generate a compressed write time table, wherein the compressed write time table comprises multiple time ranges and corresponding indexes, each index corresponds to a page of the flash memory module, and the page records block numbers and write time of all blocks whose write time is within a corresponding time range;
referring to a current time of executing the control method to determine a specific time range selected from the multiple time ranges in the compressed write time table, and referring a page address corresponding to the specific time range to read multiple block numbers and corresponding write time from the flash memory module;

recording at least a part of the multiple block numbers in an expired block table; and referring to the at least a part of the multiple block numbers recorded in the expired block table to sequentially move valid data in blocks with the at least a part of the multiple block numbers to at least one blank block.

2. The control method of claim 1, wherein the multiple time ranges correspond to multiple dedicated blocks, respectively, and an index corresponding to each time range is last one or more pages in a corresponding dedicated block.

3. The control method of claim 2, wherein a dedicated block corresponding to each time range stores only block numbers of all blocks whose write time is in said each time range, without storing block numbers of blocks whose write time is in any other time range.

4. The control method of claim 1, further comprising:

when the flash memory controller is ready to be powered off, writing the compressed write time table into a specific block of the flash memory module;

when the flash memory controller is powered on, determining whether the flash memory controller encounters an abnormal power-off before being powered on;

if it is determined that the flash memory controller has not encountered the abnormal power-off before being powered on, reading the compressed write time table from the specific block, and temporarily storing the compressed write time table in a buffer memory or a dynamic random access memory; and if it is determined that the flash memory controller encounters the abnormal power-off before being powered on, reading at least a part of the multiple blocks in the flash memory module to recreate the compressed write time table, and temporarily storing the compressed write time table in the buffer memory or the dynamic random access memory.

5. The control method of claim 4, wherein the multiple time ranges correspond to multiple dedicated blocks, respectively, and an index corresponding to each time range is last one or more pages in a corresponding dedicated block; and reading the at least a part of the multiple blocks in the flash memory module to recreate the compressed write time table comprises:

determining whether a last block written by the flash memory controller before the abnormal power-off that is prior to current power-on is one of the multiple dedicated blocks;

if the last block written by the flash memory controller before the abnormal power-off that is prior to the current power-on is not one of the multiple dedicated blocks, reading the multiple dedicated blocks to obtain write time corresponding to blocks having data written therein in the flash memory module, and generating a recreated write time table according to the write time corresponding to the blocks having data written therein in the flash memory module;

if the last block written by the flash memory controller before the abnormal power-off that is prior to the current power-on is one of the multiple dedicated blocks, sequentially reading the page of each block having data written therein in the flash memory module to obtain write time corresponding to blocks having data written therein in the flash memory module, and generating the recreated write time table according to the write time corresponding to the blocks having data written therein in the flash memory module; and compressing the recreated write time table to recreate the compressed write time table.

6. The control method of claim 4, wherein an operation of recreating the compressed write time table is completed within an initialization operation time after the flash memory controller is powered on.

7. A flash memory controller, configured to access a flash memory module, the flash memory controller comprising:

a read only memory, configured to store a code;

a microprocessor, configured to execute the code for controlling access of the flash memory module; and a buffer memory;

wherein when the microprocessor writes data to any block of the flash memory module, a write time is recorded into the block, and a write time table is created, where the write time table records block numbers of blocks having data written therein and corresponding write time, and the microprocessor compresses the write time table to generate a compressed write time table, where the compressed write time table comprises multiple time ranges and corresponding indexes, each index corresponds to a page of the flash memory module, and the page records block numbers and write time of all blocks whose write time is within a corresponding time range;

wherein the microprocessor refers to a current time to determine a specific time range selected from the multiple time ranges in the compressed write time table, and refers to an index corresponding to the specific time range to read multiple block numbers and corresponding write time from the flash memory module; the microprocessor records at least a part of the multiple block numbers in an expired block table, and refers to the at least a part of the multiple block numbers recorded in the expired block table to sequentially move valid data in blocks with the at least a part of the multiple block numbers to at least one blank block.

8. The flash memory controller of claim 7, wherein the multiple time ranges correspond to multiple dedicated blocks, respectively, and an index corresponding to each time range is last one or more pages in a corresponding dedicated block.

9. The flash memory controller of claim 8, wherein a dedicated block corresponding to each time range stores only block numbers of all blocks whose write time is in said each time range, without storing block numbers of blocks whose write time is in any other time range.

10. The flash memory controller of claim 7, wherein when the flash memory controller is ready to be powered off, the microprocessor writes the compressed write time table into a specific block of the flash memory module; when the flash memory controller is powered on, the microprocessor determines whether the flash memory controller encounters an abnormal power-off before being powered on; if the microprocessor determines that the flash memory controller has not encountered the abnormal power-off before being powered on, the microprocessor reads the compressed write time table from the specific block, and temporarily stores the compressed write time table in a buffer memory or a dynamic random access memory; if the microprocessor determines that the flash memory controller encounters the abnormal power-off before being powered on, the microprocessor reads at least apart of the multiple blocks in the flash memory module to recreate the compressed write time table, and temporarily stores the compressed write timetable in the buffer memory or the dynamic random access memory.

11. The flash memory controller of claim 10, wherein the microprocessor determines that the flash memory controller encounters the abnormal power-off before being powered on, the microprocessor determines whether a last block written by the flash memory controller before the abnormal power-off that is prior to current power-on is one of the multiple dedicated blocks; if the last block written by the flash memory controller before the abnormal power-off that is prior to the current power-on is not one of the multiple dedicated blocks, the microprocessor reads the multiple dedicated blocks to obtain write time corresponding to blocks having data written therein in the flash memory module, and generates a recreated write time table according to the write time corresponding to the blocks having data written therein in the flash memory module; if the last block written by the flash memory controller before the abnormal power-off that is prior to the current power-on is one of the multiple dedicated blocks, the microprocessor sequentially reads the page of each block having data written therein in the flash memory module to obtain write time corresponding to blocks having data written therein in the flash memory module, and generates a recreated write time table according to the write time corresponding to the blocks having data written therein in the flash memory module; and the microprocessor compresses the recreated write time table to recreate the compressed write time table.

12. The flash memory controller of claim 10, wherein an operation of recreating the compressed write time table is completed within an initialization operation time after the flash memory controller is powered on.

13. A memory device, comprising:
a flash memory module;
a flash memory controller, configured to access the flash memory module;
wherein when the flash memory controller writes data to any block of the flash memory module, a write time is recorded into the block, and a write time table is created, where the write time table records block numbers of blocks having data written therein and corresponding write time, and the flash memory controller compresses the write time table to generate a compressed write time table, where the compressed write time table comprises multiple time ranges and corresponding indexes, each index corresponds to a page of the flash memory module, and the page records block numbers and write time of all blocks whose write time is within a corresponding time range;
wherein the flash memory controller refers to a current time to determine a specific time range selected from the multiple time ranges in the compressed write time table, and refers to an index corresponding to the specific time range to read multiple block numbers and corresponding write time from the flash memory module; the flash memory controller records at least a part of the multiple block numbers in an expired block table, and refers to the at least a part of the multiple block numbers recorded in the expired block table to sequentially move valid data in blocks with the at least a part of the multiple block numbers to at least one blank block.

14. The memory device of claim 13, wherein the multiple time ranges correspond to multiple dedicated blocks, respectively, and an index corresponding to each time range is last one or more pages in a corresponding dedicated block.

15. The memory device of claim 14, wherein a dedicated block corresponding to each time range stores only block numbers of all blocks whose write time is in said each time range, without storing block numbers of blocks whose writing time is in any other time range.

16. The memory device of claim 13, wherein when the flash memory controller is ready to be powered off, the flash memory controller writes the compressed write time table into a specific block of the flash memory module; when the flash memory controller is powered on, the flash memory controller determines whether the flash memory controller encounters an abnormal power-off before being powered on; if the flash memory controller determines that the flash memory controller has not encountered the abnormal power-off before being powered on, the flash memory controller reads the compressed write time table from the specific block, and temporarily stores the compressed write time table in a buffer memory or a dynamic random access memory; if the flash memory controller determines that the flash memory controller encounters the abnormal power-off before being powered on, the flash memory controller reads at least a part of the multiple blocks in the flash memory module to recreate the compressed write time table, and temporarily stores the compressed write time table in the buffer memory or the dynamic random access memory.

17. The memory device of claim 16, wherein if the flash memory controller determines that the flash memory controller encounters the abnormal power-off before being powered on, the flash memory controller determines whether a last block written by the flash memory controller before the abnormal power-off that is prior to current power-on is one of the multiple dedicated blocks; if the last block written by the flash memory controller before the abnormal power-off that is prior to the current power-on is not one of the multiple dedicated blocks, the flash memory controller reads the multiple dedicated blocks to obtain write time corresponding to blocks having data written therein in the flash memory module, and generate a recreated write time table according to the write time corresponding to the blocks having data written therein in the flash memory module; if the last block written by the flash memory controller before the abnormal power-off that is prior to the current power-on is one of the multiple dedicated blocks, the flash memory controller sequentially reads the page of each block having data written therein in the flash memory module to obtain write time corresponding to blocks having data written therein in the flash memory module, and generate a recreated write time table according to the write time corresponding to the blocks having data written therein in the flash memory module; and the flash memory controller compresses the recreated write time table to recreate the compressed write time table.

18. The memory device of claim 16, wherein an operation of recreating the compressed write time table is completed within an initialization operation time after the flash memory controller is powered on.

* * * * *